(12) United States Patent
Wessel

(10) Patent No.: US 7,194,931 B2
(45) Date of Patent: Mar. 27, 2007

(54) RELEASE MECHANISM FOR TRIGGER SHIFTERS

(75) Inventor: Robert Wessel, Regensburg (DE)

(73) Assignee: SRAM Deutschland GmbH (DE)

( * ) Notice: Subject to any disclaimer, the term of this patent is extended or adjusted under 35 U.S.C. 154(b) by 361 days.

(21) Appl. No.: 10/361,543

(22) Filed: Feb. 10, 2003

(65) Prior Publication Data
US 2003/0167876 A1 Sep. 11, 2003

(30) Foreign Application Priority Data
Feb. 8, 2002 (DE) ................................ 102 05 278

(51) Int. Cl.
G05G 5/00 (2006.01)
(52) U.S. Cl. ................. 74/577 M; 74/500.5
(58) Field of Classification Search ............ 74/489, 74/500.5, 501.5 R, 501.6, 502.2, 533, 534, 74/535, 536, 537, 538, 577 M, 577 R, 578
See application file for complete search history.

(56) References Cited

U.S. PATENT DOCUMENTS

| 4,864,885 | A | * | 9/1989 | Nagano | ..................... 74/502.2 |
| 5,094,120 | A |   | 3/1992 | Tagawa |  |
| 5,203,213 | A | * | 4/1993 | Nagano | ..................... 74/473.14 |
| 5,315,891 | A | * | 5/1994 | Tagawa | ........................ 74/489 |
| 5,355,745 | A | * | 10/1994 | Wu et al. | ................... 74/502.2 |
| 5,361,645 | A | * | 11/1994 | Feng et al. | ................ 74/502.2 |
| 5,676,022 | A | * | 10/1997 | Ose | ............................ 74/502.2 |
| 5,829,313 | A | * | 11/1998 | Shahana | .................... 74/502.2 |
| 5,832,782 | A | * | 11/1998 | Kawakami | ............... 74/473.13 |
| 6,095,309 | A | * | 8/2000 | Mione | ........................ 192/217 |

FOREIGN PATENT DOCUMENTS

| CH | 248670 | 5/1947 |
| DE | G9015515.7 U1 | 5/1991 |
| GB | 2 169 065 | 7/1986 |

* cited by examiner

*Primary Examiner*—Vicky A. Johnson
(74) *Attorney, Agent, or Firm*—Milan Milosevic; Lisa Serdynski

(57) ABSTRACT

A release mechanism for releasing a pretensioned shift cable connected to a gear changing mechanism. The release mechanism includes a toothed disk having retention and capture teeth and is nonrotatably connected to a cable spool and a sliding member that includes retention and capture pawls. When the release mechanism is actuated the retention pawl disengages from the toothed disk, the cable spool rotates until the capture pawl engages the toothed disk and when the release mechanism is released the capture pawl disengages the toothed disk and the retention pawl once again engages the toothed disk, resulting in a stepwise release of the shifting cable.

20 Claims, 2 Drawing Sheets

RELEASE MECHANISM FOR TRIGGER SHIFTERS

BACKGROUND OF THE INVENTION

The present invention relates to trigger shifters for bicycles and more particularly to a release mechanism for a trigger shifter for a bicycle.

German Utility Model DE 90 15 515 discloses a shifter for controlling a bicycle gearing system that includes a lever and a pair of pawls. The pawls engage a toothed disk that is connected to a cable spool for winding and unwinding the shifting cable. Upon actuation of the lever in the tension direction or the release direction, the respective gear is engaged and the correspondingly associated shifting travel is achieved by winding or unwinding the shifting cable on the cable spool. Once the actuation has occurred the lever returns to its initial position. Friction devices or catch devices are arranged in the shifter housing and cooperate with the cable spool or the toothed disk to retain the cable spool in the selected position. The pawls have a configuration such that when one pawl snaps into engagement with the toothed disk, the other pawl is disengaged from the toothed disk. Since the cable spool is maintained in its current position by a spring-loaded catch device which only remains effective up to a certain retention force, the cable spool may rotate unexpectedly because it is pretensioned by the shifting cable. When the lever is actuated in the release direction, the retention force of the catch device is overcome. The cable spool, pretensioned by the shifting cable, is thereby rotated on to the next retaining position and the corresponding shifting travel is enabled. Because of the nonpositive catch device, it occasionally happens that the intended gear position is overshot during shifting operations in the release direction. There is a need for a more reliable shifter that maintains the desired gear ratio.

SUMMARY OF INVENTION

The present invention provides a trigger shifter with a release mechanism that performs release and retention operations more reliably compared to the existing prior art. The release mechanism includes a toothed disk having retention and capture teeth and is nonrotatably connected to a cable spool, and a sliding member that includes retention and capture pawls. When the release mechanism is actuated the pawls alternately engage the toothed disk, resulting in a stepwise release of the spring-pretensioned shifting cable.

The shifting operation in the release direction takes place in two phases. First, a lever is actuated in a release direction, resulting in the retention pawl being disengaged from the toothed disk so that the cable spool may rotate until the capture pawl engages in a corresponding tooth of the toothed disk. Then when the lever is returned to its neutral position by a return spring, the capture pawl releases the toothed disk and the cable spool continues to rotate because of the tension in the shifting cable until the retention pawl once again engages a corresponding tooth of the toothed disk.

In one embodiment of the present invention, the stepwise shifting operation is accomplished by the interaction of the linearly displaced sliding member with the toothed disk that is nonrotatably connected to the cable spool. The retention and capture teeth are arranged opposite from each other on the periphery of the toothed disk. The sliding member fits around the toothed disk and has at least one retention pawl and at least one capture pawl which alternately engage, depending on the current position of the sliding member, with the retention and capture teeth, respectively. When the sliding member is in a neutral position, the retention pawl is engaged with the retention teeth which ensures that the current shift position is maintained against the force of the shifting cable. When the sliding member is moved out of the neutral position, the retention pawl is disengaged from the toothed disk and the toothed disk and the cable spool rotate under the force of the shifting cable until the capture pawl engages a capture tooth, preventing further rotation of the spool. When the lever is returned to its neutral position, the sliding member returns to its neutral position and the capture pawl disengages the capture teeth and the toothed disk is rotated until the retention pawl engages the teeth. The retention pawl locks the toothed disk into place and ends the shifting operation. The shifting travel necessary for a gear ratio change is thus achieved in two stages: firstly by the rotation of the toothed disk until engagement of the capture pawl; and then by the rotation of the toothed disk until engagement of the retention pawl.

The retention teeth, in contrast with the capture teeth, have a sawtooth contour. Each retention tooth has a steep side and a flat side. The steep side ensures the toothed disk does not rotate and the current gear position is maintained. The flat side allows the retention pawl to move to the next tooth during a shifting operation in the tension direction.

The movement of the sliding member is determined by guide pins following an elongated guide in the sliding member. The present invention uses the fact that the shifting cable tension is constantly applied to the cable spool and thus the toothed disk to increase the release forces by contouring the elongated guide located in the vicinity of the retention pawl as stepped or highly convex. By having this contour, the sliding member, the retention pawl and the retention teeth are slightly moved in the tension direction which results in an increase in the actuation force necessary for the release operation.

The actuator may be a button that acts directly on the sliding member and is guided, together with the sliding member on the housing. Alternatively, the sliding member and the actuator may form one part. The actuator may also be a lever pivotable about a shaft connected to the housing. The shaft may extend parallel or perpendicular to a plane of the toothed disk. To achieve better ergonomics, the shaft may be arranged at a slight incline from the toothed disk.

A cam surface may be provided on the actuator to convert the pivoting motion of the actuator into a linear motion of the sliding member. The length of the lever and the distance from the cam surface to the lever's rotation of axis determines the effective lever ratio and may be matched to the necessary or desired actuation forces. To ensure that the actuator does not move during a shifting operation in the tension direction, it is retained in its neutral position, regardless of the current position of the sliding member, by a return spring braced against the housing.

These and other features and advantages of the invention will be more fully understood from the following description of certain specific embodiments of the invention taken together with the accompanying drawings.

DETAILED DESCRIPTION

Figure 1:
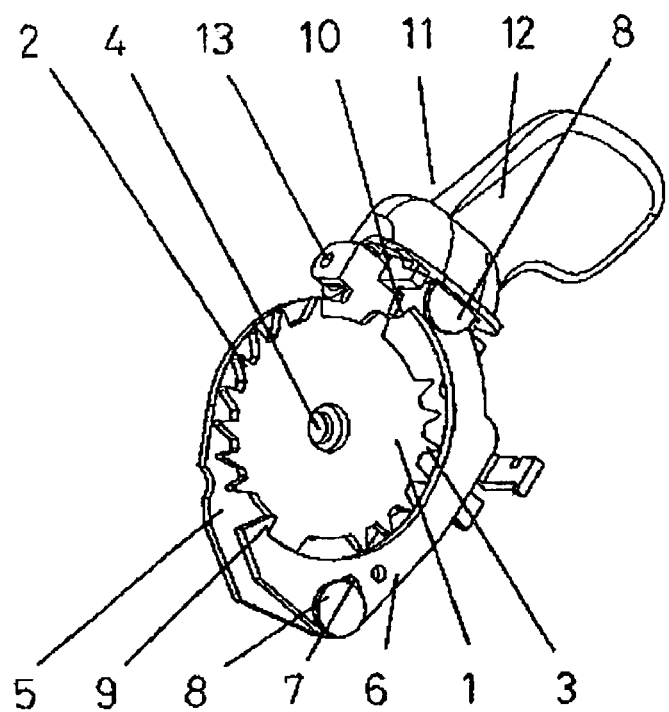
FIG. 1 is a perspective side view of a release mechanism in a neutral position in accordance with one embodiment of the present invention.

The present invention is illustrated with reference to an embodiment of the invention depicted in FIGS. 1–4. Referring to FIG. 3, the shifter of the present invention includes an actuator 11, which includes a lever 12 and a cam surface 14. The actuator 11 is connected to a housing 5 by a pivot shaft 13. A pretensioning spring 15 that is braced against the housing 5 biases the actuator in a neutral position as shown in FIG. 1. The lever 12 may be actuated in a release direction to unwind a shift cable (not shown) connected to a gear changing mechanism (not shown). The shift cable is wound and unwound about a cable spool 18. The cable spool 18 is nonrotatably connected to a toothed disk 1 that has retention teeth 2 and capture teeth 3 on its periphery. Alternatively, the cable spool 18 and the toothed disk 1 may form one part. The retention teeth 2 and the capture teeth 3 are located opposite one another and have different tooth contours. The teeth 2 and 3 may be offset by approximately 180 degrees. The cable spool 18 rotates about a centering pin 19 that extends through an orifice 4 of the toothed disk 1 and is anchored in the housing 5.

A sliding member 6 fits around the toothed disk 1 and includes two pawls 9, 10. The sliding member 6 is attached to the housing 5 by two guide pins 8 that are received in two elongated guides 7 of the sliding member 6. When the lever 12 and the sliding member 6 are in a neutral position as shown in FIG. 1, the retention pawl 9 engages a tooth of the retention teeth 2 and the capture pawl 10 is disengaged from the capture teeth 3. The retention pawl 9 has a sawtooth contour corresponding to the contour of the retention teeth 2. Each retention tooth 2 has a steep side and a flat side. The steep side of each tooth ensures that the toothed disk 1 does not move when in the neutral position and the flat side of each tooth facilitates disengagement of sliding member 6 when shifting in the tension direction.

A release operation is performed by operating an actuator 11. The actuator 11 includes the lever 12 which pivots about a shaft 13. The actuator 11 also includes the cam surface 14 which cooperates with a corresponding cam follower surface 16 on the sliding member 6. The cam follower surface 16 on the sliding member 6 extends perpendicular to a plane of the toothed disk 1. When lever 12 is released again after actuation has been accomplished, a pretensioning spring 15 that is braced against the housing part 5 brings lever 12 back to the neutral, and a return spring 17 brings the sliding member 6 back into the neutral position.

Figure 2:
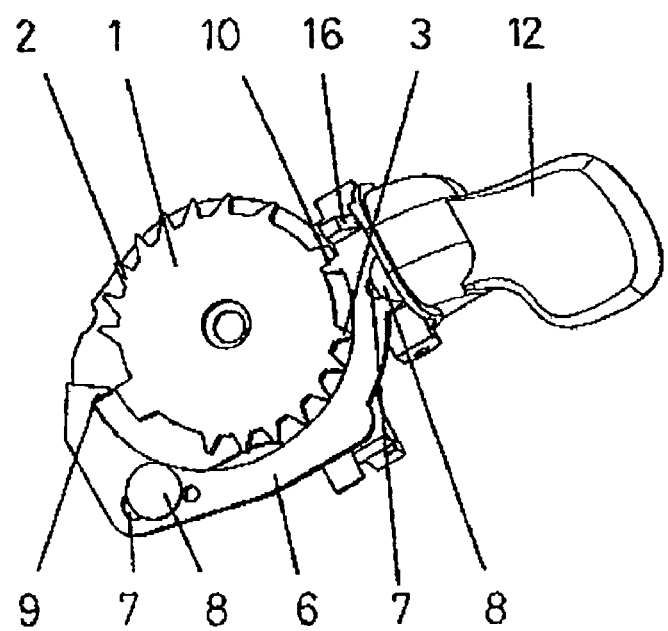
FIG. 2 is a perspective side view of the release mechanism of FIG. 1 in a captured position.
Figure 3:
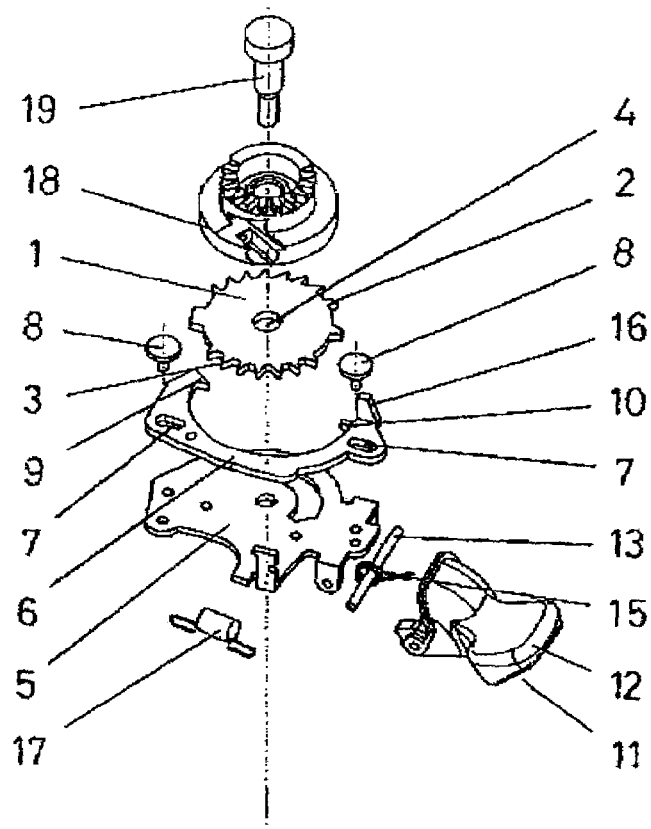
FIG. 3 is an exploded view of the release mechanism in accordance with one embodiment of the present invention.

FIG. 2 shows the release mechanism in a captured positioned. The capture pawl 10 is engaged with the corresponding tooth 3 and prevents any rotation of the toothed disk 1. When the lever 12 is in an actuation position, the retention pawl 9 is disengaged from the retaining teeth 2 by the cam surface 14 acting on the cam follower surface 16 on the sliding member 6. The linear motion of the sliding member 6 is guided and limited by elongated holes 7 in the sliding member 6 and by guide pins 8.

Figure 4:
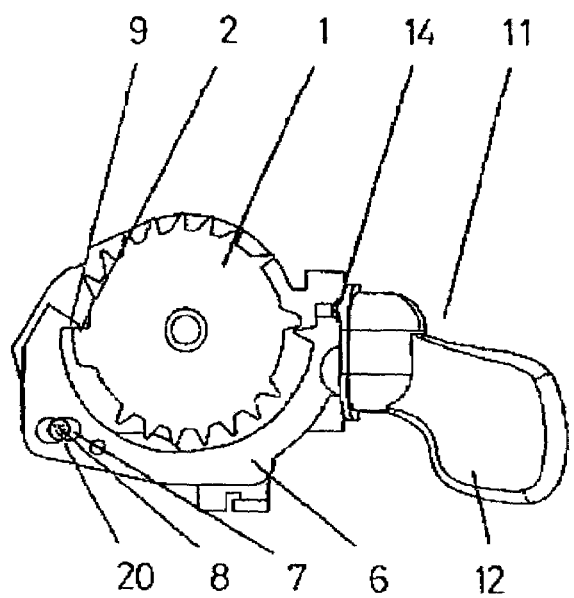
FIG. 4 is a side view of the release mechanism in accordance with one embodiment of the present invention.

In FIG. 4 the lever 12 has not yet been completely actuated. The sliding member 6 is displaced by the cam surface 14 on the actuator 11 that engages the cam follower surface 16 of the sliding member 6. In the position shown, retention pawl 9 has already been partially disengaged from retention tooth 2. Toothed disk 1, the retention pawl 9 and the sliding member 6 are pretensioned in the unwinding direction by the cable spool 18 which is pretensioned by the shift cable. An uneven guiding contour 20 of the elongated guide 7 is configured so that when the actuator 11 is moved from the neutral position, the sliding member 6 slightly deflects in the tension direction along guide pin 8. This deflection in the tension direction against the pretensioning force of the shift cable and cable spool 18, imposed by the stepped guiding contour 20, results in a higher actuation force at the pivot lever 12. There is, however, no feedback effect on the actuation force necessary in the tension direction, since the guide pin 8 rests against the approximately straight contour of the elongated guide 7 located opposite the guiding contour 20.

While this invention has been described by reference to a specific embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A release mechanism for releasing a pretensioned shift cable connected to a gear changing mechanism at one end and windable about a cable spool at a second end, said release mechanism comprising:
   a housing;
   a toothed disk operatively connected to the cable spool;
   a one-piece sliding member having at least two opposing pawls alternately engaging the toothed disk during a release operation; and
   an actuator for actuating the one-piece sliding member.

2. The release mechanism of claim 1, wherein the at least two opposing pawls include at least one retention pawl and at least one capture pawl, the one-piece sliding member being biased tow&d a neutral position.

3. The release mechanism of claim 2, wherein the toothed disk includes retention teeth cooperatively engaging the retention pawl and capture teeth cooperatively engaging the capture pawl.

4. The release mechanism of claim 3, wherein the retention teeth and the capture teeth are arranged on the periphery of the toothed disk offset by approximately 180 degrees.

5. The release mechanism of claim 3, wherein the retention teeth have a sawtooth shape.

6. The release mechanism of claim 2, wherein in the neutral position the retention pawl engages the toothed disk.

7. The release mechanism of claim 1, further comprises a return spring biasing the one-piece sliding member toward a neutral position.

8. The release mechanism of claim 7, wherein the one-piece sliding member and the return spring form one part.

9. The release mechanism of claim 1, wherein the one-piece sliding member is configured to slide linearly relative to the housing in a plane substantially parallel to a plane of the toothed disk.

10. The release mechanism of claim 9, wherein a first one of the one-piece sliding member and the housing having an elongated guide and a second one of the one-piece sliding member and the housing having a pin, the pin configured to slide reciprocally along the elongated guide.

11. The release mechanism of claim 10, wherein the elongated guide includes a uneven guiding contour engageable by the pin to inhibit motion of the one-piece sliding member out of the neutral position such that the release force is increased.

12. The release mechanism of claim 1, further comprising a device for inhibiting the sliding motion of the one-piece sliding member during a release operation such that a release force of the release mechanism is increased.

13. The release mechanism of claim 1, wherein the actuator has a cam surface and the one-piece sliding member has a corresponding cam follower surface, the cam and cam follower surfaces configured such that motion of the actuator is transferred to the one-piece sliding member.

14. The release mechanism of claim 13, wherein the cam surface and the cam follower surface are arranged substantially perpendicular to a plane of the toothed disk.

15. The release mechanism of claim 13, wherein the actuator pivots about a pivot shaft supported by the housing, the pivot shaft extending substantially parallel to a plane of the toothed disk.

16. The release mechanism of claim 15, wherein the pivoting motion of the actuator is converted into a linear motion of the one-piece sliding member by the cooperating motion of the cam surface and the cam follower surface.

17. The release mechanism of claim 13, wherein the actuator pivots about a pivot shaft supported by the housing, the pivot shaft extending substantially perpendicular to a plane of the toothed disk.

18. The release mechanism of claim 17, wherein the pivoting motion of the actuator is converted into a linear motion of the one-piece sliding member by the cooperating motion of the cam surface and the cam follower surface.

19. The release mechanism of claim 1, wherein the one-piece sliding member and the actuator form one part.

20. The release mechanism of claim 1, wherein the one-piece sliding member is hingedly connected to the actuator.

* * * * *

UNITED STATES PATENT AND TRADEMARK OFFICE
CERTIFICATE OF CORRECTION

PATENT NO. : 7,194,931 B2  Page 1 of 1
APPLICATION NO. : 10/361543
DATED : March 27, 2007
INVENTOR(S) : Robert Wessel It is certified that error appears in the above-identified patent and that said Letters Patent is hereby corrected as shown below:

At column 4, line 37, delete "tow&d" and insert -- toward --.

Signed and Sealed this

Fifteenth Day of May, 2007

JON W. DUDAS
*Director of the United States Patent and Trademark Office*